US011941138B2

(12) United States Patent
Mardini et al.

(10) Patent No.: US 11,941,138 B2
(45) Date of Patent: *Mar. 26, 2024

(54) DATA DELETION AND OBFUSCATION SYSTEM

(71) Applicant: Pilot Travel Centers LLC, Knoxville, TN (US)

(72) Inventors: John Mardini, Knoxville, TN (US); Adam Neubauer, Knoxville, TN (US); Greg Hydro, Knoxville, TN (US)

(73) Assignee: PILOT TRAVEL CENTERS, LLC, Knoxville, TN (US)

( * ) Notice: Subject to any disclaimer, the term of this patent is extended or adjusted under 35 U.S.C. 154(b) by 480 days.

This patent is subject to a terminal disclaimer.

(21) Appl. No.: 17/096,609

(22) Filed: Nov. 12, 2020

(65) Prior Publication Data

US 2021/0383007 A1 Dec. 9, 2021

Related U.S. Application Data

(60) Provisional application No. 63/034,745, filed on Jun. 4, 2020.

(51) Int. Cl.
*G06F 21/62* (2013.01)
*G06F 16/951* (2019.01)
(52) U.S. Cl.
CPC ........ *G06F 21/6218* (2013.01); *G06F 16/951* (2019.01)

(58) Field of Classification Search
CPC . G06F 21/6218; G06F 21/6254; G06F 16/951
See application file for complete search history.

(56) References Cited

U.S. PATENT DOCUMENTS

| 6,078,914 | A | * | 6/2000 | Redfern | G06F 16/3334 |
| | | | | | 707/999.005 |
| 6,141,694 | A | * | 10/2000 | Gardner | G06F 11/3438 |
| | | | | | 709/240 |
| 6,266,668 | B1 | * | 7/2001 | Vanderveldt | G06F 16/9535 |
| 6,532,459 | B1 | * | 3/2003 | Berson | G06F 16/951 |
| 8,819,208 | B2 | * | 8/2014 | Wright | G06F 3/0608 |
| | | | | | 707/756 |
| 8,856,937 | B1 | * | 10/2014 | Wuest | G06F 21/56 |
| | | | | | 713/188 |
| 9,342,553 | B1 | * | 5/2016 | Fuller | G06F 16/245 |
| 10,467,434 | B2 | * | 11/2019 | Smyth | H04L 63/105 |
| 11,106,386 | B1 | * | 8/2021 | Sun | G06F 16/2455 |
| 2003/0217060 | A1 | * | 11/2003 | Stockton | H04L 67/306 |
| 2005/0080780 | A1 | * | 4/2005 | Colledge | G06F 16/951 |

(Continued)

*Primary Examiner* — Han Yang
(74) *Attorney, Agent, or Firm* — Seth L. Hudson; Maynard Nexsen PC (57) ABSTRACT

Systems and methods for obfuscating and/or deleting data records are provided. In one implementation, a method for obfuscating data includes a step of receiving a request from a client to obfuscate data records associated with the client. The data records are stored in one or more databases throughout a network. The method also includes searching for one or more occurrences of the data records appearing throughout the network. Upon determining that the data records can be obfuscated without causing undesirable consequences elsewhere in the network, the method includes obfuscating the one or more occurrences of the data records.

17 Claims, 7 Drawing Sheets

(56) References Cited

U.S. PATENT DOCUMENTS

| | | | |
|---|---|---|---|
| 2015/0081654 A1* | 3/2015 | Spangler | G06F 16/3325 |
| | | | 707/723 |
| 2018/0137179 A1* | 5/2018 | Kawanabe | G06Q 10/10 |
| 2019/0180050 A1* | 6/2019 | Barday | H04L 67/1097 |
| 2019/0188327 A1* | 6/2019 | Bastide | G06F 16/9535 |
| 2019/0392173 A1* | 12/2019 | Brannon | G06F 21/6245 |
| 2020/0117737 A1* | 4/2020 | Gopalakrishnan | |
| | | | G06F 16/9535 |
| 2020/0125766 A1* | 4/2020 | Yang | H04L 9/50 |
| 2020/0372172 A1* | 11/2020 | Murray | G06F 16/9024 |
| 2021/0089538 A1* | 3/2021 | Rooney | G06F 16/2282 |

* cited by examiner

DATA DELETION AND OBFUSCATION SYSTEM

CROSS REFERENCE TO RELATED PATENT APPLICATION

The present application claims the benefit of priority to U.S. Provisional Patent Application No. 63/034,745, filed on Jun. 4, 2020, and entitled "DATA DELETION AND OBFUSCATION SYSTEM," the contents of which are incorporated in full by reference herein.

TECHNICAL FIELD

The present disclosure generally relates to networking services. More particularly, the present disclosure relates to systems and methods for accumulating data from diverse data platforms and performing deletion and obfuscation processes on the data.

BACKGROUND

Generally, a customer relationship and service management system, often referred to as a CRM or SMS, includes a unitary set of databases that may be used to assist a client with particular online services. However, a client may wish to perform certain functions whereby the data may be stored in databases spread throughout various networks and may not be accessible from one specific platform. Normally, people do not want to delete data from networks, but eventually the amount of data that can be retrieved about anyone can be a security issue. Also, the deletion of data can cause liability issues with some data management businesses. Therefore, it is important to ensure that when data is deleted, the correct data is selected and handled securely. Issues can arise when a data manager pulls the wrong data or improperly handles this data during the deletion process.

Most software products typically operate where there is a reasonable end to the lifetime of useful data. There is a need to provide a tool to handle data that is no longer viable and should be removed from all databases in a network, cloud, or on the Internet. Currently, there are no common tools that are automated to handle these situations in a safe and secure manner on a widespread scale. Since it is not feasible to scale currently existing security programs to perform certain obfuscation processes, it would be desirable to provide a tool that safely allows deletion when a request for such a data deletion is received.

Therefore, there is a need in the field of networking to provide a network of diverse databases for allowing a client to perform operations on data records stored in various locations in a network and to perform deletion and obfuscation operations, which can be done under a single data platform. Another need is to perform these actions on a one-to-one basis while being careful to check and confirm the entire process. It is also desirable to provide an audit trail for security and compliance reasons.

BRIEF SUMMARY

The present disclosure is directed to systems and method for obfuscating and/or deleting data records. According to one implementation, a method includes the step of receiving a request from a client to obfuscate data records associated with the client, where the data records are stored in one or more databases throughout a network. The method also includes the step of searching for one or more occurrences of the data records appearing throughout the network. Upon determining that the data records can be obfuscated without causing undesirable consequences elsewhere in the network, the method further includes obfuscating the one or more occurrences of data records.

According to another implementation, an obfuscation system includes a network interface configured to access a network, a processing device, and a memory device configured to store instructions. When executed, the instructions are configured to enable the processing device to receive a request from a client to obfuscate data records associated with the client, where the data records are stored in one or more databases throughout the network. The instructions further enable the processing device to search for one or more occurrences of the data records appearing throughout the network. Upon determining that the data records can be obfuscated without causing undesirable consequences elsewhere in the network, the processing device is configured to obfuscate the one or more occurrences of the data records.

According to yet another implementation, a non-transitory computer-readable medium is configured to store computer logic having instructions that enable a processing device to perform certain functions. For example, the processing device is configured to receive a request from a client to obfuscate data records associated with the client, where the data records are stored in one or more databases throughout a network. The processing device searches for one or more occurrences of the data records appearing throughout the network. Upon determining that the data records can be obfuscated without causing undesirable consequences elsewhere in the network, the processing device is further configured to obfuscate the one or more occurrences of the data records.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for enabling a client to access data that may be present in any of a number of diverse databases and performing various services with respect to this data. For example, a client may wish to delete or obfuscate certain data. Upon receiving such a request to delete/obfuscate data, the systems and methods of the present disclosure may be configured to query the various data sources to determine that the data still exists and to determine that the data sources are legitimate sources. Also, the embodiments of the present disclosure may include determining if the data can be deleted and/or obfuscated without causing undesirable consequences elsewhere in a network, such as if the data may be needed by some other program operating in the network. If the data can be deleted/obfuscated without negative consequences, then the privacy services, security services, and data efficiency services of deleting and/or obfuscating may be performed. It is important to note that the application of this disclosure is not limited to privacy, security, and data efficiency; any number of data processing services can be applied in which the end result and or goal is to delete and/or obfuscate data. Additionally, the embodiments herein are directed to CRM and SMS, but these are just a few examples of areas in which the present disclosure may prove beneficial. Additional fields include, but are not limited to, data privacy, health care security and privacy, governmental security and privacy, data efficiency and system management, and any field in which deletion and/or obfuscation of data would prove beneficial. After the data is deleted/obfuscated, the present disclosure further includes the process of performing a self-check to determine that the data has indeed been deleted and/or obfuscated as intended. If so, a certificate of destruction or other confirmation may be presented to the requestor to provide a guarantee that the data has been eliminated or unrecognizable beyond a reasonable chance of recovery.

Figure 1:
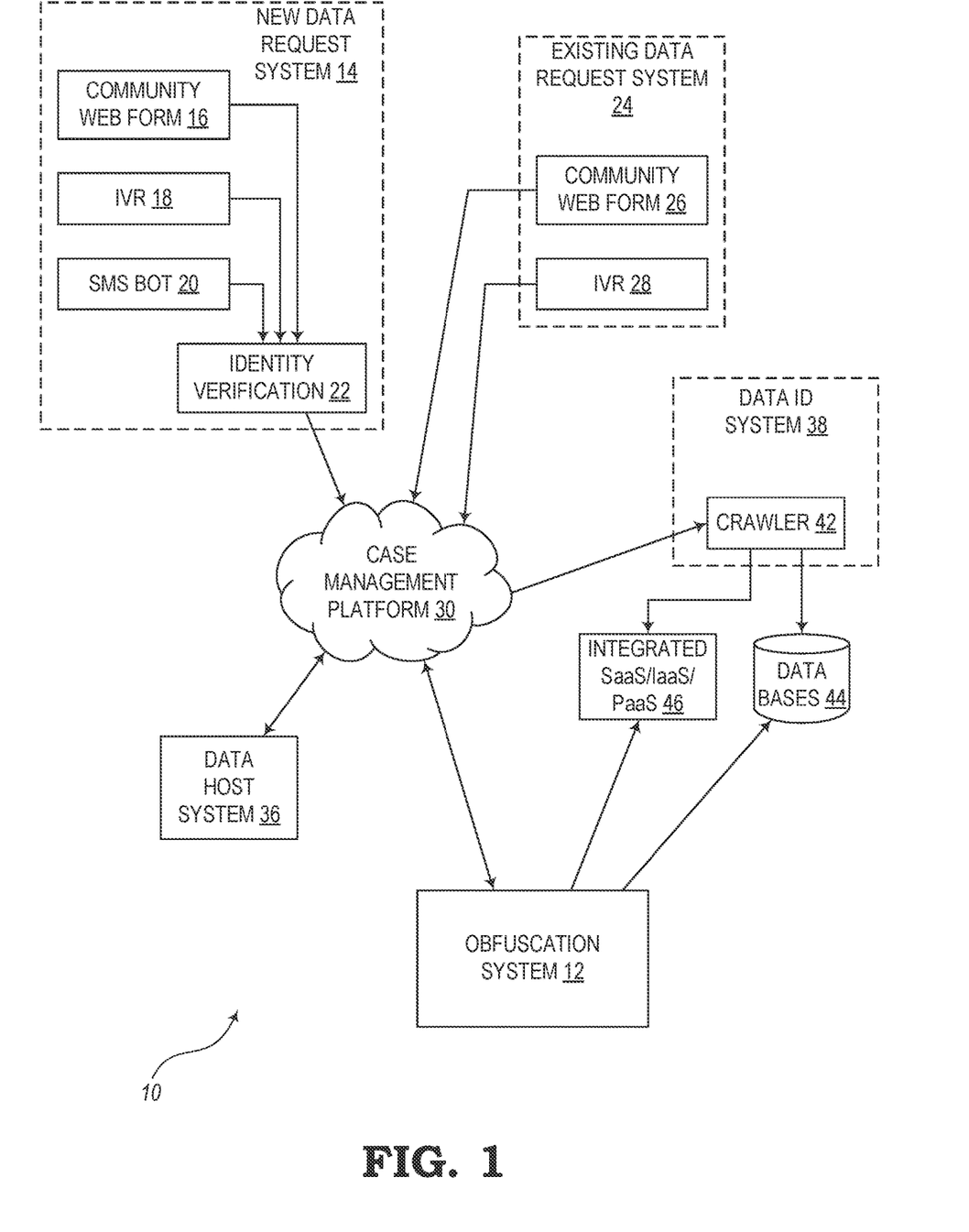
FIG. 1 is a block diagram illustrating a data management system, according to various embodiments of the present disclosure.

FIG. 1 illustrates a schematic diagram of an example embodiment of a data management system data management system 10. The data management system 10 includes an obfuscation system 12 configured to receive requests to obfuscate data as a service to clients. The obfuscation system 12 is described in more detail below. In the illustrated embodiment of FIG. 1, the data management system 10 includes input systems for receiving requests, such as requests from clients to delete or obfuscate data or records.

For example, a new data request system 14 is configured for receiving data requests from new clients, such as clients who may wish to request a one-time service, clients being registered as new clients, etc. The requests include demands to delete and/or obfuscate data or data records. Requests for data services may be received via a community web form 16 (e.g., internal and/or external community web forms), a voice system (e.g., an interactive voice response (IVR) 18 system), a short message service (SMS) bot 20, or other input devices. The request is sent to an identity verification system 22 configured to verify the identity of the new client.

The data management system 10 further includes an existing data request system 24 for receiving new requests for data services (e.g., request to delete/obfuscate data records) from existing clients, for receiving other types of requests, for receiving changes to an existing data request from the client, etc. The existing data request system 24 may include community web forms 26 and an IVR 28 for receiving requests from existing clients. The new data requests and existing data requests from the new data request system 14 and existing data request system 24, respectively, may be provided to the obfuscation system 12 via a case management platform 30. In the example embodiment of FIG. 1, the case management platform 30 includes systems configured to manage data requests according to the clients' needs.

In additional embodiments, the data management system 10 of FIG. 1 includes databases and/or tables accessible to data modules of the case management platform 30. Also, a data host system 36 may be configured to enable one or more managers (or a staff of people) to service and monitor activities within the data management system 10. The managers/staff can enter data as needed and/or view operational conditions and client information (when specific authorization for certain managers/staff is given) using the data host system 36. The data host system 36 also allows the managers/staff to perform other operations as needed to maintain the data management system 10 as is known by those of skill in the art as a database engineer.

Also shown in the example embodiment of a data management system 10 of FIG. 1 is a data identification (ID) system 38. The data ID system 38 includes one or more crawlers 42 (e.g., web crawlers or other types of network crawling engines). The crawlers 42 are configured as an Internet engine that searches or browses the Internet, World Wide Web, Wide Area Network (WAN), or any other distributed network. Typical crawlers 42 are search engines for performing Web indexing and updating web content of various web sites so that web searches can be performed more efficiently. Web crawlers are also known as web spiders or web robots and various algorithms are attributed to the crawling nature and efficiency of the web crawler. Results from the crawlers 42 may be provided to databases 44 and/or integrated Software as a Service (SaaS), Infrastructure as a Service (IaaS), and/or Platform as a Service (PaaS) 46. The crawlers 42 listed herein is but one example of an data ID system 38, additional indexing algorithms and identification methods are contemplated and disclosed.

In another example embodiment, the data identification system 38 is configured to determine a certain number of items (e.g., six items) that reside in a number of columns (e.g., six columns) needing obfuscation. In additional embodiments the data identification system 38 can be configured to support any number of items, so long as at least one item is designated. In the example embodiment of FIG. 1, two of these items may include a first name (fname) field and a last name (lname). Some of the remaining items in this example may be null (empty), or filled with representative data fields. In the example embodiment, the six items may be individually placed in a message queue of an obfuscation engine 52 (FIG. 2) as "tasks," lined up for obfuscation and deletion, as described below.

In the example embodiment of FIG. 1 crawlers 42 are configured to store data in the databases 44 and/or supply information to the integrated SaaS/IaaS/PaaS 46. Likewise, the obfuscation system 12 performs certain functions, as described below, and is capable of storing data in the databases 44 and providing information to the integrated SaaS/IaaS/PaaS 46.

In the example embodiment of FIG. 1, when the case management platform 30 receives notifications that all six task IDs on a case (e.g., case number 0001) are complete, a Certificate of Destruction may be generated and presented to the requestor. In additional embodiments the number of task ID's required can be set to any number greater than one. The Certificate of Destruction may simply be an acknowledgement or receipt that the deletion/obfuscation has be completed. In other embodiments the Certificate of Destruction can exist in complex forms such as part of a block chain system or a web token or additional embodiments that may be preserved as identification of the deletion/obfuscation task.

In the example embodiment of FIG. 1, the community web forms 16, 26 of the new data request system 14 and existing data request system 24 are configured as a customer relationship management (CRM) system, which may include hardware/software for managing the business relationships and interactions that a client may have with customers and/or potential customers. The purpose of a typical CRM system is to develop the client's business relationships to enable the client to maintain contact with customers, optimize various customer processes, etc.

The data host system 36 in the example embodiment of FIG. 1 enables any employees (e.g., customer service employees, recruiters, human resources personnel, marketing personnel, etc.) to utilize the CRM system of the present disclosure. Thus, the data host system 36 enables these employees to manage the business relationships and interactions with customers, potential customers, staff, etc., for a client. The CRM system allows the client to store contact information for its customers (and potential customers), sales opportunity information, service issue records, etc., to allow the obfuscation system 12 to manage customer information (e.g., privacy information) in one location, such that various employees can access the privacy information, as needed and according to various levels of security authorization.

In FIG. 1, the SMS bot 20 is configured to simplify communication flow in the data management system 10. The SMS bot 20 provides a user interface for allowing customers to make new privacy requests. In additional embodiments the SMS bot is an engine utilized in facilitating communications in the new data request system 14.

In FIG. 1, the Identity Verification module 22 of the new data request system 14 includes hardware/software for providing digital identity processing as well as fraud protection. This process may also include verification and authentication of identity information to prevent identity theft, while also making it easy for a new client to join or for a new data request to be made in an easy and user-friendly manner. Example embodiments of hardware/software features for identify verification include biometric identification, knowledge-based authentication, two-factor authentication, and additional verifications that facilitate the verification of a user.

Figure 2:
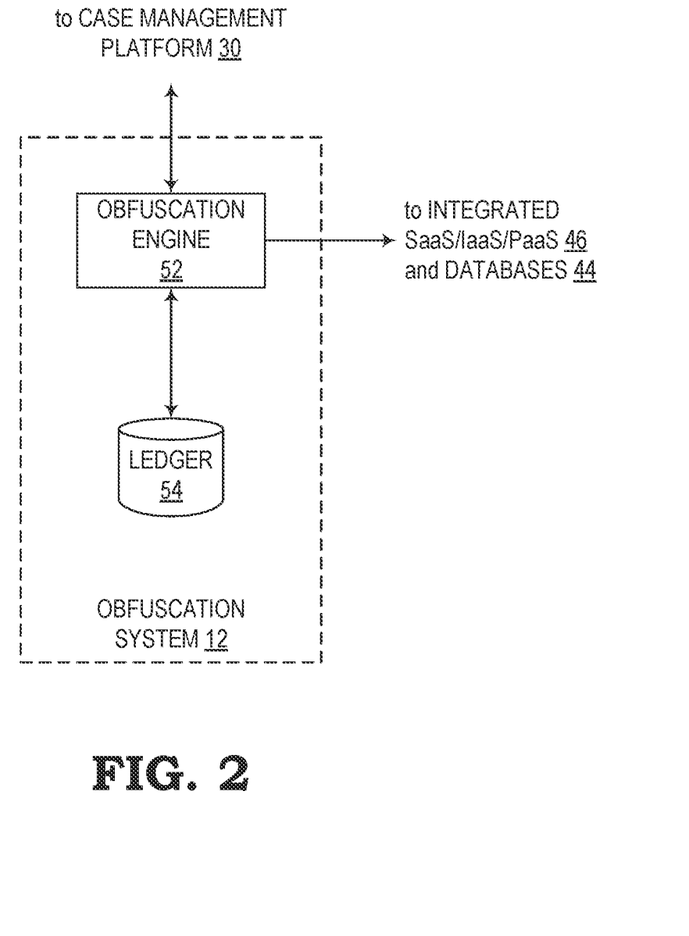
FIG. 2 is a block diagram illustrating an obfuscation system shown in FIG. 1, according to various embodiments of the present disclosure.

FIG. 2 is an example embodiment of the obfuscation system 12 shown in FIG. 1. The obfuscation system 12 may also be referred to as an "obfuscation bot" or "O-BOT." According to the example embodiment of FIG. 2, the obfuscation system 12 includes an obfuscation engine 52 and a ledger 54. The requests from the clients obtained using the new data request system 14 and/or existing data request system 24 may be obtained via the case management platform 30 and stored in the ledger 54 (or databases 44). The obfuscation engine 52 may access information stored in a memory or a queue of the ledger 54 for retrieving one or more request messages (or one or more tasks associated with each request) stored in the ledger 54. The request messages may be queued to enable the obfuscation engine 52 to perform various deletion/obfuscation processes described herein.

Figure 4:
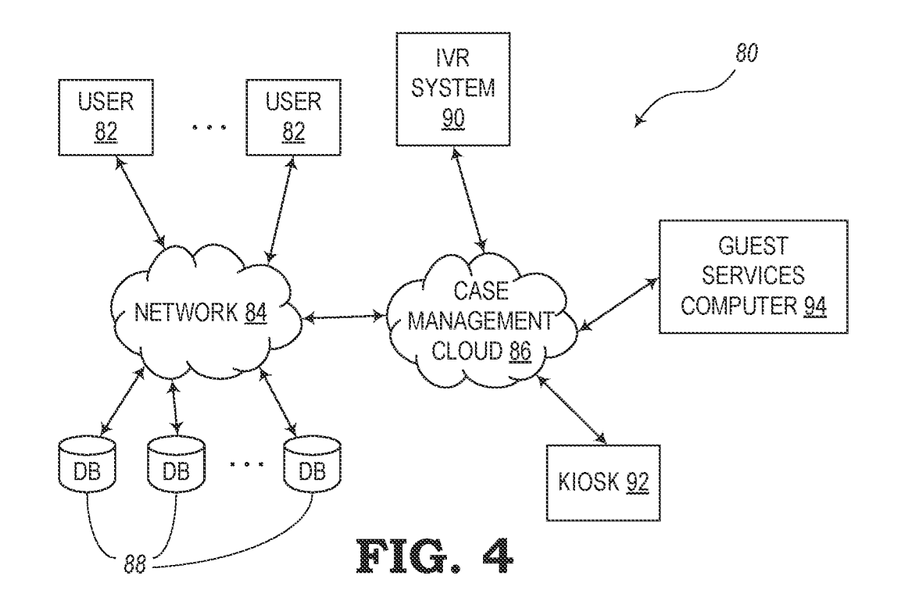
FIG. 4 is a block diagram illustrating a system having data obfuscation functionality, according to various embodiments.

In FIG. 2, the obfuscation system 12 is an integration platform that includes integration software for connecting applications, data, and devices. In additional example embodiments the obfuscation system 12 is a stand along application, in even further embodiments the obfuscation system is a resource available through an API. The obfuscation system 12 may include a service oriented architecture (SOA), SaaS, application programming interface (API), etc. for providing data services for one or more clients. At a high level, the obfuscation system 12 receives "tasks" that may be derived from the stored request messages. In some embodiments, each task may include one field that requires obfuscation. Each task may be handled independently such that the tasks can be performed one at a time, subsequently, simultaneously, or according to any suitable sequence or timing scheme.

The obfuscation engine 52 may select one task at a time, or multiple tasks in parallel. The tasks may be ranked in a number of ways (e.g., low priority, high priority, important, very important, slow and steady, etc.). In some embodiments, the tasks may be stored in the ledger 54 using a First-In First-Out (FIFO) method. The obfuscation engine 52 may also write the tasks and other information to the ledger 54, including, for example, a case number, task ID, etc., and may mark a status as pending. It should be noted that the tasks may be classified as Pending, Complete, or Error. Steps can be marked as Pass or Fail.

After writing to the ledger 54, the obfuscation engine 52 begins a process on each task to remove the data wherever it is housed throughout the network. According to some embodiments, the removal process may include four steps, as described herein. The four-step process in the example embodiment includes: 1) confirm, 2) obfuscate, 3) validate, and 4) report. In additional embodiments the various steps may be combined or expanded to assist with clarity of operation and will be known to those of skill in the art.

Step 1: Confirm that the data in the task matches the data in the database. This provides quality assurance to ensure that the task is valid. The results are reported to ledger 54 as PASS or FAIL.

Step 2: Obfuscate the data in the database using the data classification model in the data classification database to determine the method of obfuscation. Some methods of obfuscation may include rip/replace, encrypt/keyflush, etc. For example, rip/replace may include a sequence of steps where the data is ripped into multiple parts and then replaced with different or random data. The encrypt/keyflush operation may include encrypting the data and then discarding the key such that the data remains encrypted in an unrecoverable manner. The status of the results of obfuscation is then reported to the ledger 54 as PASS or FAIL.

Step 3: Validate that the data in the task no longer matches the data in the database. This may be referred to as a quality assurance measure to self-check that obfuscation has been performed successfully. The results may be reported to the ledger 54 as PASS or FAIL. The validation involves a file verification task, which may include a bit-by-bit comparison, a hash-based verification, or any other verification technique to verify the change of the data.

Step 4: Report task status as complete (if the processes are successful) to a system of record, which may be part of the Case Management Platform 30. The status may be detected by checking the ledger 54 for three PASS flags from each of the previous steps.

At a high level, the obfuscation engine 52 of the obfuscation system 12 receives "tasks," which may be stored in a queue. Each task may include one field to be obfuscated. The following is an example of fields of a table that may be stored in memory:

| fname | mname | lname | address1 | address2 | city | state | zip |
|-------|-------|-------|----------|----------|------|-------|-----|
| John | null | Smith | 1234 Pilot Ave | null | Knoxville | TN | 37909 |

In the above example, the table, which may be stored in the database 44 (or ledger 54), may have eight columns with personal information for "John Smith." The data ID system 38 determines that six items of personal information reside in six of the eight columns needing obfuscation, such as fname, lname, etc. The remaining two columns are labeled as null/empty in this example. The six items are sent to the obfuscation engine 52 of the obfuscation system 12, placed in the queue as "tasks," and scheduled for obfuscation by the obfuscation engine 52.

The obfuscation engine 52 may select one task at a time based on priority (e.g., high priority, low priority, important, very important, slow and steady, etc.). In additional embodiments, the order of tasks may be determined by the order in which the fields are stored in a FIFO memory. The obfuscation engine 52 writes information on the ledger 54, where the information may include a case number, task ID, etc. The obfuscation engine 52 may also mark the status of tasks as "pending," "completed," or "errored." After writing to the ledger 54, the obfuscation engine 52 begins the four-step process mentioned above with respect to each task to remove the data in whatever database the data is housed. Each task may be marked as Pass or Fail.

Returning back to the example embodiment including six tasks, when the case management platform 30 receives notifications that all six task IDs on a case number (e.g., case number 0001) are complete, the case management platform 30 may be configured to generate a Certificate of Destruction and present it to the requestor in any suitable format.

Therefore, one way that the obfuscation system 12 may operate is that it may receive a privacy request (e.g., to delete or obfuscate data) from the data management system 10 or another suitable platform. The request is temporarily stored in the databases 44, the ledger 54, a message queue, or in any other suitable memory device, where it is stored as one or more "tasks." The obfuscation system 12 looks at the first (or next) task to be processed and determines how the data can be safely deleted or obfuscated. The obfuscation system 12 queries the source of the data to make sure that the source still exists and is a legitimate source. Then, the obfuscation system 12 may be configured to look at a table to determine how the data can be deleted or obfuscated without causing undesirable issues or consequences elsewhere in the system. For example, it may be determined that certain information may be relied upon by other applications in the data management system 10 and cannot be completely deleted without causing errors in those other applications.

In additional embodiments the obfuscation system 12 will dynamically look for deletion/obfuscation instructions (e.g., in a table) and then apply corresponding logic to remove the data in a safe way that does not harm the databases 44 or downstream systems. Afterwards, the obfuscation system 12 may perform a self-check process to make sure that the data has actually been removed (or has been sufficiently obfuscated to the point where the data to be deleted/obfuscated no longer matches the data in the databases). This can be considered to be a self-audit or self-validation process.

Turning to the "four step" process example embodiment, for each of the first three steps of the "four-step" process, the obfuscation engine 52 can report to the ledger 54 a "pass" status. Then the fourth step of reporting the success to the client is performed, the status of "pass" also being reported to and stored in the ledger 54. As such, the four steps can be applied for each task. Each task has three steps that are performed by the obfuscation engine 52, plus the fourth step that involves receiving the status report at the ledger 54. Once a task is complete, meaning that all three steps have received a "pass" or "fail" grade, the obfuscation system 12 tells the data management system 10 that it has completed the task. At this time, the obfuscation system 12 can grab a new task from the message queue. The obfuscation system 12 may be configured to process one task at a time.

The obfuscation system 12 can find information regarding tasks. A primary key of one of the crawlers 42 may be important, at least in that the obfuscation system 12 may ultimately be configured to obtain the location of the data on which it is intended to execute the four-step process. The obfuscation system 12 can find that primary key and correlate that back to the table, which essentially allows the obfuscation engine 52 to locate a specific row of data.

However, if that row of data is a header in an email, the obfuscation engine 52 may determine that the email cannot be deleted, but it may need to be unique. The obfuscation engine 52 can then create a unique key and plug in whatever domain it could be. For example, it may plug in "@unique-domain.com which can be put into that cell, rather than the original email domain name. At this point, the obfuscation engine 52 can delete the email, which is discarded for good. The process of obfuscating involves creating an encrypted key that will eventually be thrown away or discarded. In this way, when a client wants to know if the email has been deleted, it may be obfuscated with the encryption key, which is discarded with very little chance of recovery. As such, there may essentially be no way to retrieve this data and it can be considered as completely deleted or sufficiently obfuscated with practically no way to get it back.

Again, in the example embodiment, the steps include Step 1: searching and finding the data field to confirm that the data exists; Step 2: executing the obfuscation using a specific program/application (process) based on the classification of the data, where the classification information may be stored in a table to indicate which program should be used to obfuscate it and whether or not to hatch it, remove it, put the label of "private" in it, or whatever it may be programmed to do; Step 3: going back to the databases to confirm, validate, or audit that the obfuscation system 12 has in fact completed that task and that the data requested to be removed/obfuscated does not reasonably match the data stored in the corresponding databases; and Step 4: writing to the ledger 54 that steps 1-3 received a "pass" grade and reporting to the client that the task is complete. When this task is done, the obfuscation engine 52 may pull a new task from the message queue and start the four-step process again, and so on, one piece of information or task at a time.

The four-step process may be considered to be a safety feature for safely deleting or obfuscating data according to a client's request. It may be compared to a kill/delete switch with a validation process to make sure that the deletion is complete and/or the obfuscation is irreversible. If, for whatever reason, something goes wrong, the obfuscation system 12 may be configured to stop the process without any damage. The system self-audits to make sure that the deletion/obfuscation processes are executed without any issues.

In the example embodiment of FIG. 2, the obfuscation system 12 is be configured to run silently behind the scenes without communicating with other applications on the network. It may be deployed as a loyalty function in a system-wide or enterprise-wide Autonomous System (AS). By operating to delete/obfuscate data on demand, the program is built to ensure that issues do not arise in a downstream system. For instance, if a row of data were removed, there is a possibility that downstream applications may experience errors that may be critical to various business operations. When instructed to delete, the obfuscation system 12 can detect the system 10 to determine if deletion would cause problems. Therefore, by performing the four-step process, the obfuscation system 12 can ensure that downstream systems will not be negatively affected.

The obfuscation system 12 can be configured to work with any platform, such as the platform described below with respect to FIG. 4. The obfuscation engine 52 may be configured to include one or more Application Programming Interface (API) gateways and software code or logic to perform the various deletion and obfuscation functions. Details of the hardware components of the obfuscation system 12 are described with respect to FIG. 3 below.

In the example embodiment of FIG. 2, a cell source feeds information to the obfuscation engine 52 and may be stored in a message queue, which may be part of or separate from the obfuscation engine 52. Information in the request messages stored in the queue may be delivered to the obfuscation engine 52. The obfuscation engine 52 performs the various deletion/obfuscation programs and writes back to the queue before the obfuscation engine 52 executes the next task. The ledger 54 can go back to receive information from the message queue.

Figure 3:
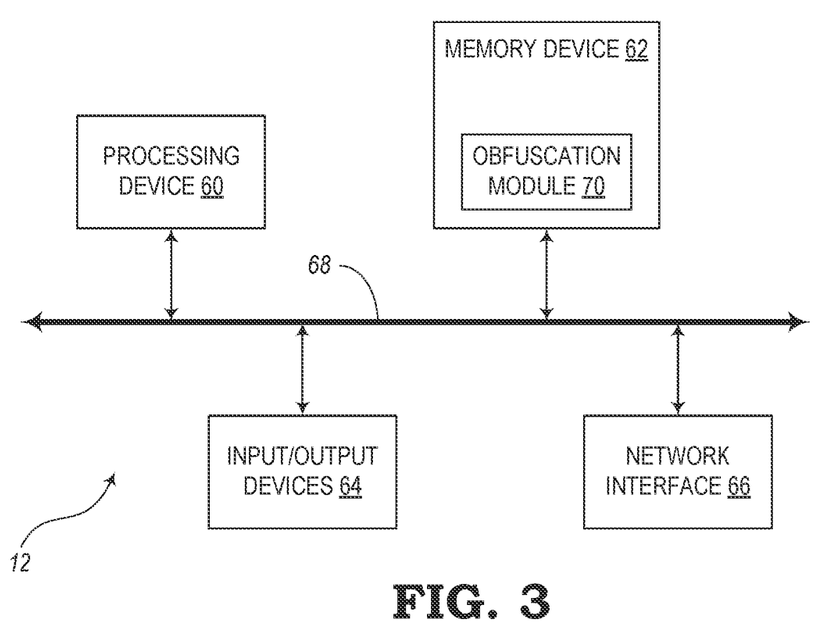
FIG. 3 is a block diagram illustrating the obfuscation system shown in FIG. 1, according to various embodiments of the present disclosure.

FIG. 3 shows a block diagram of another embodiment of the obfuscation system 12 shown in FIGS. 1 and 2. The obfuscation system 12 may include a processing device 60, a memory device 62, input/output devices 64, and a network interface 66. Those skilled in the pertinent art will appreciate that various embodiments may be described in terms of logical blocks, modules, circuits, algorithms, steps, and sequences of actions, which may be performed or otherwise controlled with a general purpose processor, a DSP, an application specific integrated circuit (ASIC), a field programmable gate array, programmable logic devices, discrete gates, transistor logic, discrete hardware components, elements associated with a computing device, or any suitable combination thereof designed to perform or otherwise control the functions described herein. The processing devices 60 may be a general purpose processor or microprocessor, but in the alternative, the processing device 60 may be any conventional processor, controller, microcontroller, or state machine. A processing device 60 may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments described in the present disclosure may be implemented as electronic hardware, computer software, or any suitable combinations thereof. To clearly illustrate this interchangeability of hardware and software, various illustrative components, blocks, modules, circuits, algorithms, and steps have been described herein in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

The methods, sequences and/or algorithms described in connection with the embodiments disclosed herein may be embodied directly in hardware, in a software module executed by a processor, or any suitable combination thereof. Software modules may reside in memory controllers, DDR memory, RAM, flash memory, ROM, electrically programmable ROM memory (EPROM), electrically erase programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers.

Combinations of the above should also be included within the scope of computer-readable media.

According to some embodiments, FIG. 3 illustrates an embodiment of the obfuscation system 12 for offering data services for a user/client and allowing the user/client to make certain requests, such as search for the client's name among multiple databases that may be accessed by various systems through the network of FIG. 1. In additional embodiments, the services may include deleting personal records from these databases to allow the user/client to be able to be invisible from hackers, robocalls, telemarketers, etc. In the illustrated embodiment, the obfuscation system 12 may be a digital computer that, in terms of hardware architecture, generally includes the processing device, the memory device, the input/output (I/O) devices, and the network interface. In further embodiments the obfuscation system 12 may be a special purpose computing device, that is equipped with the hardware and software to execute the system.

The memory device 62 may include a data store, database, or the like. It should be appreciated by those of ordinary skill in the art that FIG. 3 depicts the obfuscation system 12 in a simplified manner, where practical embodiments may include additional components and suitably configured processing logic to support known or conventional operating features that are not described in detail herein. The components are communicatively coupled via a local interface 68. The local interface 68 may be, for example, but not limited to, one or more buses or other wired or wireless connections. The local interface 68 may have additional elements, which are omitted for simplicity, such as controllers, buffers, caches, drivers, repeaters, receivers, among other elements, to enable communications. Further, the local interface 68 may include address, control, and/or data connections to enable appropriate communications among the components.

The processing device 60 is a hardware device adapted for at least executing software instructions. The processing device may be any custom made or commercially available processor, a central processing unit (CPU), an auxiliary processor among several processors associated with the case management platform 30, a semiconductor-based microprocessor (in the form of a microchip or chip set), or generally any device for executing software instructions. When the obfuscation system 12 is in operation, the processing device 60 may be configured to execute software stored within the memory device 62, such as the obfuscation module 70, to communicate data to and from the memory device 62, and to generally control operations of the case management platform 30 pursuant to the software instructions.

It will be appreciated that some embodiments of the processing device 60 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 60 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry or logic" that is "configured to or adapted to" perform a set of operations, steps, methods, processes, algorithms, functions, techniques, etc., on digital and/or analog signals as described herein for the various embodiments.

The I/O devices 64 may be used to receive user input from and/or for providing system output to one or more devices or components. User input may be provided via, for example, a keyboard, touchpad, a mouse, and/or other input receiving devices. The system output may be provided via a display device, monitor, graphical user interface (GUI), a printer, and/or other user output devices. I/O interfaces 64 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The network interface 66 may be used to enable the obfuscation system 12 to communicate over the network or case management platform 30, the Internet, a wide area network (WAN), a local area network (LAN), and the like. The network interface 66 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 66 may include address, control, and/or data connections to enable appropriate communications on the case management platform 30. The network interface 66 also allows communication with the integrated SaaS/IaaS/PaaS 46 and/or databases 44.

The memory device 62 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 62 may incorporate electronic, magnetic, optical, and/or other types of storage media. The memory device 62 may have a distributed architecture, where various components are situated remotely from one another, but can be accessed by the processing device. The software in memory device 62 may include one or more software programs, each of which may include an ordered listing of executable instructions for implementing logical functions. The software in the memory device 62 may also include a suitable operating system (O/S) and one or more computer programs. The operating system (O/S) essentially controls the execution of other computer programs, and provides scheduling, input-output control, file and data management, memory management, and communication control and related services. The computer programs may be configured to implement the various processes, algorithms, methods, techniques, etc. described herein.

The memory device 62 may include a data store used to store data. In one example, the data store may be located internal to the obfuscation system 12 and may include, for example, an internal hard drive connected to the local interface in the obfuscation system 12. Additionally, in another embodiment, the data store may be located external to the obfuscation system 12 and may include, for example, an external hard drive connected to the I/O devices or interfaces (e.g., SCSI or USB connection). In a further embodiment, the data store may be connected to the obfuscation system 12 through a network and may include, for example, a network attached file server.

Moreover, some embodiments may include a non-transitory computer-readable storage medium having computer readable code stored in the memory device 62 for programming the obfuscation system 12 or other processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by the processing device 60 that, in response to such execution, cause the processing device 60 to perform a set of operations, steps, methods, processes, algorithms, functions, techniques, etc. as described herein for the various embodiments.

As illustrated in FIG. 3, the memory device 62 may be configured to store various software applications, including, for example, the obfuscation module 70. The obfuscation module 70 may enable the obfuscation system 12 to execute obfuscation services to enact processing actions on the private data and user records described in the present disclosure. For example, upon receiving a client request to delete/obfuscate client data from one or more databases distributed throughout a network, a crawler tool may be used to find the occurrences the client data and various data sources (e.g., databases) can be queried to determine that they are legitimate and to determine that the data still exists on these data sources. If the data can be deleted or obfuscated without causing undesirable consequences to other programs operating elsewhere in the network, then the data can be deleted and/or obfuscated according to the data request. Also, the obfuscation module 70 may further be configured to enable the deleting of obfuscated records and a validation procedure to validate that the data has indeed been removed or sufficiently obfuscated such that the data cannot be recovered by an unauthorized person (e.g., hacker, robo-caller, etc.).

FIG. 4 is a block diagram illustrating an embodiment of a computing system 80 for enabling cloud services for one or more clients or users 82. The computing system 80 in this embodiment includes a network 84, such as a Wide Area Network (WAN), the Internet, or other suitable communications network. The computing system 80 also includes a case management cloud 86 in communication with the network 84. In particular, the computing system 80 may be configured to provide data services for users 82. For example, personal records and other information pertaining to an individual may be stored in one or more databases 88, files, etc., which may be accessible to various systems in communication with the network 84. When a client's identification is verified, the user 82 may request access to the personal information of the client. When this information is accessed, the client may desire to or request the performance of certain functions on the data. For example, the user 82 may wish to delete certain information according to the deletion/obfuscation techniques disclosed herein.

The case management cloud 86 may be configured to receive a request from a user 82. The request may be received by phone, by mail, in person, by a representative using the data host system 36 or guest services computer 94, via the network or Internet, using an interactive voice response (IVR) system 90, via text message, or by other suitable method. The requests may be made online using a user device connected to the network. In some embodiments, the request can be made using a kiosk 92 or using a guest services computer 94. Once a request is received, the case management cloud 86 may be configured to perform an automated ID verification process to verify that the client is legitimate (e.g., is the client himself/herself, is a legal representative of the client, etc.) and has authority to access that client's personal information. The case management cloud 86 can then open a ticket or service order for showing the services that are to be performed for the client.

In the computing system 80, multiple databases 88 may be available for access by the users 82. The databases 88 may be diverse and separately managed by various service companies. For example, one or more data service systems, which may represent various data service companies, may be connected to the case management cloud 86. In turn, the data service systems are configured to manage and/or access one or more of the databases 88. Therefore, in combination, the case management cloud 86 may be able to integrate together the various databases 88 via the data service systems to an accumulated database that can be processed under one platform.

The case management cloud 86 may be configured to operate in compliance with various privacy laws and regulations according to the jurisdiction in which the case management 86 is deployed. For example, the case management cloud 86 may operate in compliance with the California Consumer Privacy Act (CCPA).

In operation, when a request has been received and ID information of the requester is verified, the case management cloud 86 is able to search across multiple databases 88, network environments, enterprises, etc. For example, if a client wishes to search for or delete records regarding a name (e.g., John Smith), the case management cloud 86 is configured to search the databases 88 and other environments for "John Smith" and returns a result to the user 82, such as, "We found 163 results for John Smith."

In response to the results that were found, the user 82 can perform various actions, depending on the client's authorization. For example, the client may wish to delete certain files or records. The client may also wish to simply view the records. In some cases, the client can modify the records. The computing system 80 provides an end-to-end automated system that allows the user 82 to delete records stored in diverse databases 88 and/or perform other various actions on the data records.

Figure 5:
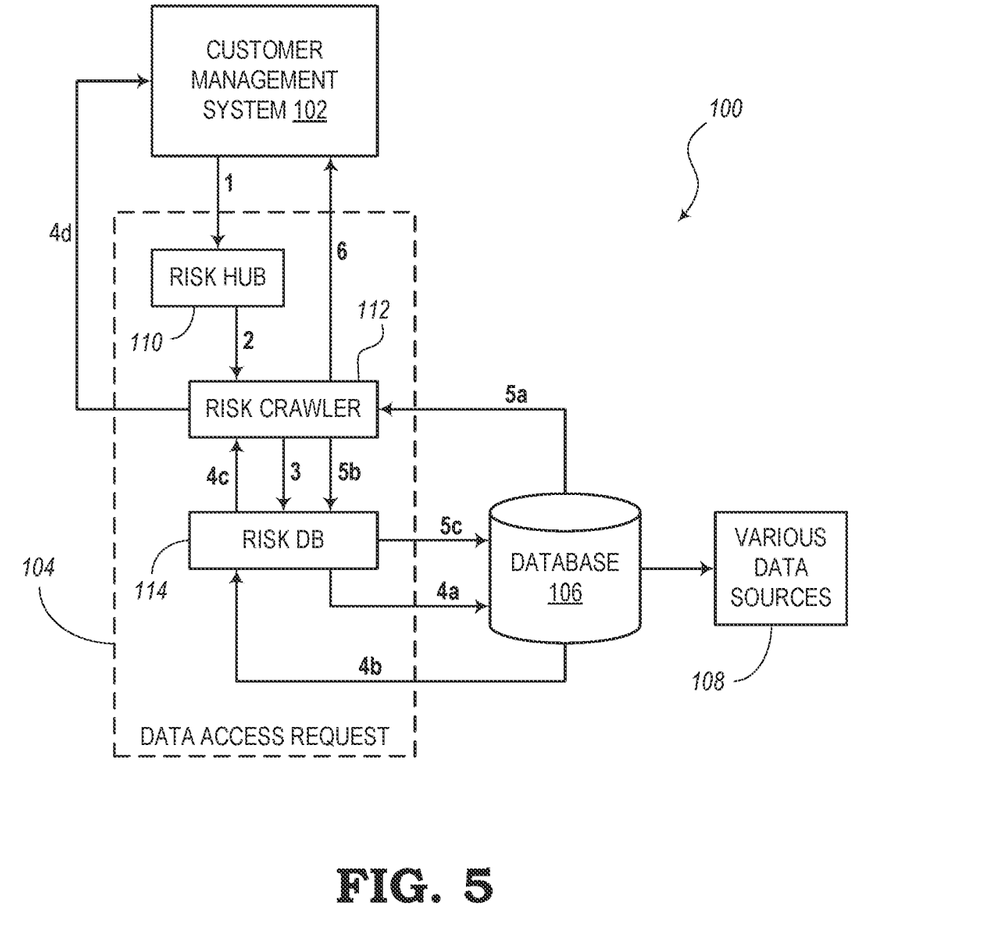
FIG. 5 is a block diagram illustrating a data request system, according to various embodiments.

FIG. 5 is a block diagram illustrating an example embodiment of a system 100 showing Application Programming Interface (API) calls. The system 100 comprises a customer management system 102, a data access request system 104, a database 106 (e.g., implemented as a data storage system for storing large amounts of data), and various data sources 108. The data access request system 104 includes a risk hub module 110, a risk crawler module 112, and a risk DB module 114. The sequence of the programming calls is also shown in FIG. 5 and described below.

For performing a POST operation, steps 1, 2, 3, and 4a are executed. In step 1, a call is made from the customer management system 102 to the risk hub module 110 of the data access request system 104. The call 1 may include:
POST requestType=access
id=<companyid>
email, displayName, address, phone In step 2, a call is made from the risk hub module 110 of the data access request system 104 to the risk crawler module 112 of the data access request system 104. The call 2 may include:
POST requestType=access
id=<companyid>

In step 3, a call is made from the risk crawler module 112 of the data access request system 104 to the risk DB module 114 of the data access request system 104. The call 3 may include:
POST requestType=access
id=<companyid>

In step 4a, a call is made from the risk DB module 114 of the data access request system 104 to the database 106. The call 4a may include:
POST (synch call)

For performing a reporting operation, steps 4b, 4c, and 4d may be executed. In step 4b, a call is made from the database 106 back to the risk DB module 114 of the data access request system 104. The call 4b may include:
reportID=<reportID>

In step 4c, a call is made from the risk DB module 114 of the data access request system 104 to the risk crawler module 112 of the data access request system 104. The call 4c may include:
requestType=access
id=<companyid>
reportID=<reportID>

In step 4c, a call is made from the risk DB module 114 of the data access request system 104 to the risk crawler module 112 of the data access request system 104. The call 4c may include:
requestType=access
id=<companyid>
reportID=<reportID>

In step 4d, a call is made from the risk crawler module 112 of the data access request system 104 to the customer management system 102. The call 4d may include:
POST requestType=access
id=<companyid>
reportID=<reportID>

For performing a get or callback operation, steps 5a, 5b, and 5c, may be executed. In step 5a, a call is made from the database 106 to the risk crawler module 112 of the data access request system 104. The call 5a may include:
Callback async
POST reportID=<reportID>

In step 5b, a call is made from the risk crawler module 112 of the data access request system 104 to the risk DB module 114 of the data access request system 104. The call 5b may include:
GET reportID=<reportID>

In step 5c, a call is made from the risk DB module 114 of the data access request system 104 to the database 106. The call 5b may include:
GET reportID=<reportID>

In step 6, the risk crawler 112 of the data access request system 104 reports back to the customer management system 102.

Figure 6:
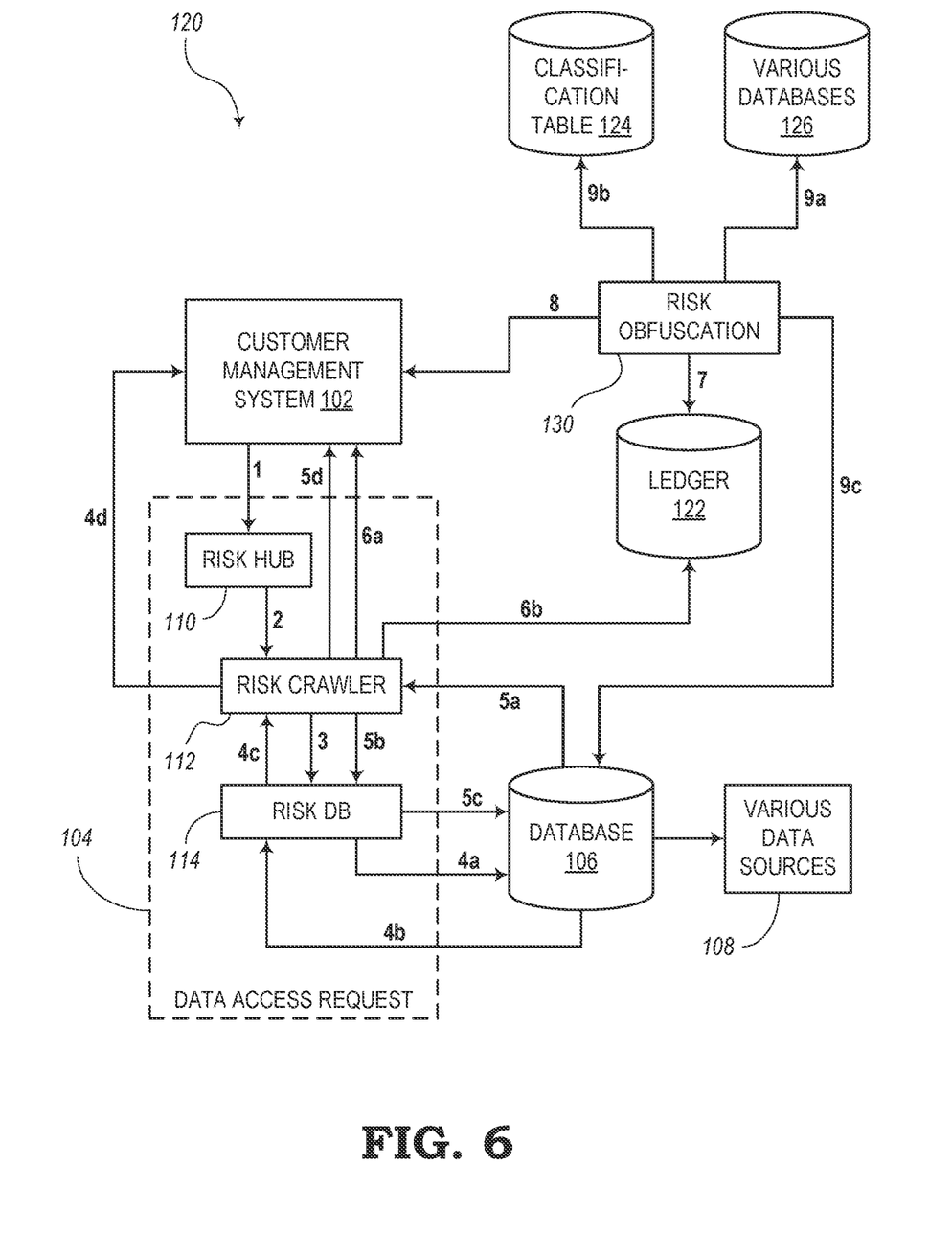
FIG. 6 is a block diagram illustrating a data request and obfuscation system, according to various embodiments.

FIG. 6 is a block diagram illustrating another embodiment of a system 120 showing API calls and includes many of the same elements shown in the embodiment of FIG. 5. The system 120 includes the customer management system 102, the data access request system 104, the database 106, and the various data sources 108, as shown in FIG. 5. In addition, the system 120 of FIG. 6 also includes a ledger 122 (e.g., obfuscation ledger), a risk obfuscation module 130, classification table 124, and various other databases 126. Again, the sequence of calls is shown in FIG. 6. Steps 1, 2, 3, 4a, 4b, 4c, 4d, 5a, 5b, and 5c described with respect to FIG. 5 may be included in the API process illustrated in FIG. 6.

In addition to the previously described steps, the sequence may further include steps 6a, 6b, 7, and 8. In step 6a, a call is made from the risk crawler module 112 of the data access request system 104 to the customer management system 102. The call 6a may include:
GET requestType, companyID for reportID In step 6b, a call is made from the risk crawler module 112 of the data access request system 104 to the ledger 122. The call 6b may include:
PARSE JSON into individual tasks
POST requestType, reportID, companyID, tasks In step 7, a call is made from the risk obfuscation module 130 to the ledger 122. The call 7 may be single threaded and may include processing one task at a time. After each step, the risk obfuscation module 130 may be configured to write a pass/fail result to the ledger 122.

In step 8, a call is made from the risk obfuscation module 130 to the customer management system 102. The call 8 may include an update of an object at completion of all tasks for the reportID.

The risk obfuscation module 130 may be configured (step 9a) to record "tasks" in the various databases 126. Also, the risk obfuscation module 130 may be configured (step 9b) to periodically add obfuscation refresh information of a data classification catalog to the classification table 124. For example, the information may be refreshed according to any periodic schedule, such as hourly, daily, weekly, etc. The periodic refreshing may include updating once a day (e.g., nightly). In some embodiments, the classification table 124 may be stored in the ledger 122 or other obfuscation ledger.

Also, the risk obfuscation module 130 may be configured (step 9c) to periodically add obfuscation refresh information of a data source catalog to the database 106. For example, the information may be refreshed in any suitable period, such as hourly, daily, weekly, etc. The periodic refreshing may include updating once a day (e.g., nightly).

According to the example embodiments, methods may be executed by the systems 100, 120. The methods may include the following steps: STEP 0: Write task to ledger 122 and match to reported. STEP 1: Confirm the data in the task matches the data in the database 106 using DS Catalog information to look up the data (quality assurance to ensure the task is valid and report to Ledger as PASS/FAIL). STEP 2: Obfuscate the data in the database using the data classification model to determine the method of obfuscation (rip/replace, encrypt/keyflush, etc.) and report status to the Ledger as PASS/FAIL. STEP 3: Validate the data in the task no longer matches the data in the database (quality assurance to self-check obfuscation and report to Ledger as PASS/FAIL). STEP 4: Report task status (hopefully, complete) to the System of Record (e.g., a case management platform) by checking the ledger 122 of the obfuscation system 120 for three PASS flags from each step.

A ledger schema layout (e.g., for the ledger 122) may include data classification model criteria for all possible obfuscation types (name, email, address, city, state, zip, phone, IP, mac, employee, username, guide, loyalty card, household, transid, companyid). The ledger schema layout may need an email encryption process flow. The ledger schema layout may also include Legal Holds and a Task ID in Full Report JSON.

Figure 7:
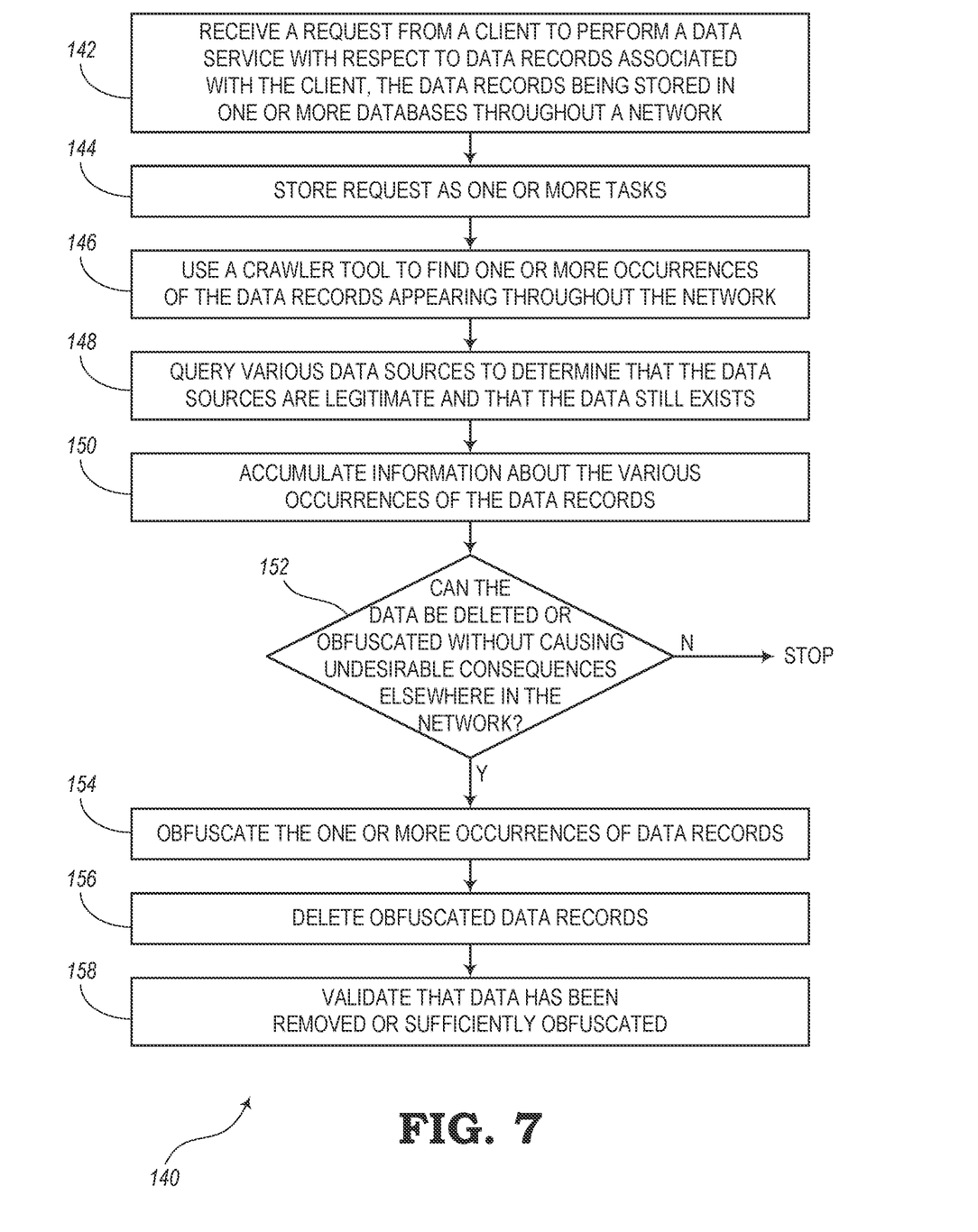
FIG. 7 is a flow diagram illustrating a process for handling data for a client, according to various embodiments.

FIG. 7 is a flow diagram showing an example embodiment of a process 140 for handling privacy data for a client.

In this embodiment, the process 140 includes receiving a request from a client to perform a data service with respect to data records associated with the client, as indicated in block 142. The data records, for example, may be stored in one or more databases throughout a network (e.g., the Internet, WAN, enterprise network, or other type of widespread network). The process 140 also includes storing the request as one or more tasks, as indicated in block 144. For example, the tasks may be executed one at a time.

The process 140 also includes using a crawler tool (e.g., web crawler) to find one or more occurrences of the data records appearing throughout the network, as indicated in block 146. For example, multiple occurrences of the data records may be stored in multiple databases dispersed throughout the network, where each occurrence may be accessible by the client. According to block 148, the process 140 may also include querying various data sources (e.g., databases) to determine that the data sources are legitimate and to determine that the data still exists in these data sources.

Also, the process 140 includes the step of accumulating information about the various occurrences of the data records, as indicated in block 150. According to the decision block 152, the process 140 also includes determining if the data can be deleted or obfuscated without causing undesirable consequences elsewhere (e.g., downstream) in the network. If no (i.e., undesirable consequences would be caused), then the process 140 ends. Otherwise, the process 140 proceeds to block 154.

Block 154 includes the step of obfuscating the one or more occurrences of the data records, which may include any suitable type of obfuscation procedures (such as the obfuscation process described below with respect to FIG. 8). For example, the actions of obfuscation may include any suitable type of steps for rendering the data records unintelligible, whereby the obscured records will be practically impossible for an unauthorized person (e.g., hacker) to decipher. Also, the process 140 may include obfuscating the data records one task at a time, where the tasks may be ranked based on priority.

According to additional embodiments, the handling of the client's privacy data may further include the step of deleting the obfuscated data records, as indicated in block 156. Thus, any remnants of the data after obfuscation may further be handled by deleting this obfuscated data in a way where the deleted data is completely eliminated. The process 140 may include a step of validating that the data has actually been removed or sufficiently obfuscated, as indicated in block 158.

Figure 8:
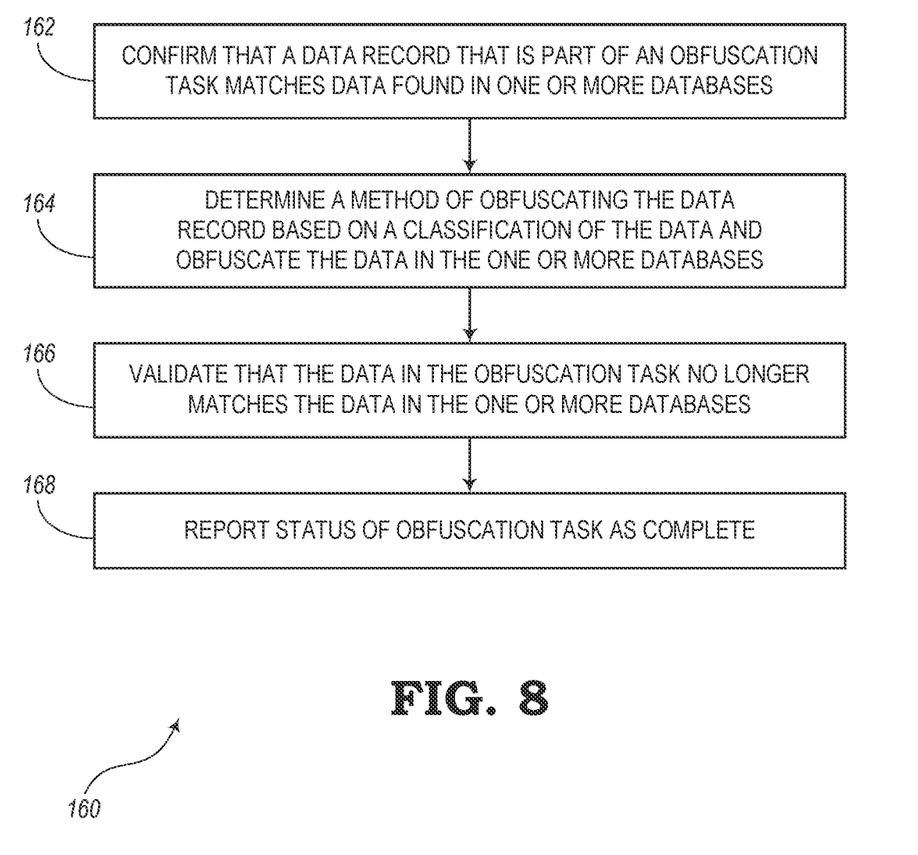
FIG. 8 is a flow diagram illustrating a process for obfuscating data, according to various embodiments.

FIG. 8 is a flow diagram showing an example embodiment of a process 160 for obfuscating data. For example, in some embodiments, the process 160 may include obfuscating data records as indicated in block 148 of FIG. 7.

In the embodiment of FIG. 8, the process 160 may include a step of confirming that a data record that is part of an obfuscation task matches data found in one or more databases, as indicated in block 162. The process 160 also includes determining a method of obfuscating the data record based on a classification of the data and then obfuscating that data in the one or more databases, as indicated in block 164. For example, various methods of obfuscation may include a "rip/replace" procedure where the data is separated in multiple pieces and each piece is replaced with different or random data, an "encrypt/key flush" procedure where the data is encrypted and the key used for encryption is destroyed or flushed, or other suitable types of obfuscation procedures.

Also, process 160 further includes validating that the data in the obfuscation task no longer matches the data in the one or more databases, as indicated in block 166. Thus, it is determined whether the obfuscation step of block 164 actually results in the data being unrecognizable or at least no longer includes intelligible information that can be traced to the original data. The process 160 of FIG. 8 may also include reporting the status of the obfuscation task as complete, as indicated in block 168. For example, the action of reporting (block 168) may include sending a physical or electronic copy of a "certificate of destruction." This certificate of destruction may be generated and presented to the requestor in any suitable form to provide a guarantee that the obfuscation process is successful and give assurance to the client that the data records have indeed been obscured and/or deleted beyond recovery.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A method for obfuscating data, the method comprising the steps of:
   receiving a request from a client to obfuscate data records associated with the client, the data records being stored in one or more databases throughout a network;
   searching, by a crawler tool, for one or more occurrences of the data records appearing throughout the network based at least in part on one or more tasks to obfuscate data corresponding to the request, the one or more tasks being derived from the request and stored at a ledger;
   storing, by the crawler tool, information corresponding to one or more found occurrences of the data records;
   determining that the one or more found occurrences of the data records can be obfuscated without causing undesirable consequences elsewhere in the network if at least a portion of the found occurrences are relied upon by other applications in the network;
   selecting the one or more tasks from the ledger based on a determined priority; and
   obfuscating the one or more found occurrences of the data records based on the one or more selected tasks.

2. The method of claim 1, wherein the step of searching for the one or more occurrences further includes the step of confirming that the one or more occurrences are related to the request to obfuscate the data records.

3. The method of claim 1, further comprising the step of querying one or more data sources that store the one or more occurrences to determine whether the one or more data sources are legitimate and whether the data records still exist.

4. The method of claim 1, further comprising the step of deleting the obfuscated data records.

5. The method claim 1, further comprising the step of validating that the data records have indeed been removed or sufficiently obfuscated beyond recovery.

6. The method of claim 5, wherein the step of validating further includes determining that the data in the request no longer matches the data in the more or more databases.

7. The method of claim 1, further comprising the step of determining a procedure for obfuscating the data records based on a classification of the data records prior to the step of obfuscating the one or more occurrences of the data records.

8. The method of claim 1, further comprising the step of reporting a status of the request as complete.

9. An obfuscation system comprising:
a network interface configures to access a network;
a processing device; and
a memory device configured to store instructions that, when executed, enable the processing device to:
receive a request from a client to obfuscate data records associated with the client, the data records being stored in one or more databases throughout the network;
search, by at least one crawler of a crawler tool, for one or more occurrences of the data records appearing throughout the network, based at least in part on one or more tasks to obfuscate data corresponding to the request, the one or more tasks being derived from the request and stored at a ledger;
store, by the crawler tool, information corresponding to one or more found occurrences of the data records;
determine that the one or more found occurrences of the data records can be obfuscated without causing undesirable consequences elsewhere in the network if at least a portion of the found occurrences are relied upon by other applications in the network;
select the one or more tasks from the ledger based on a determined priority; and
obfuscate the one or more found occurrences of the data records based on the one or more selected tasks.

10. The obfuscation system of claim 9, wherein searching for the one or more occurrences further includes confirming that the one or more occurrences are related to the request to obfuscate the data records.

11. The obfuscation system of claim 9, wherein the instructions further enable the processing device to query one or more data sources that store the one or more occurrences to determine whether the one or more data sources are legitimate and whether the data records still exist.

12. The obfuscation system of claim 9, wherein the instructions further enable the processing device to validate that the data records have indeed been removed or sufficiently obfuscated beyond recovery and determine that the data in the request no longer matches the data in the one or more databases.

13. The obfuscation system of claim 9, wherein, prior to obfuscating the one or more occurrences of the data records, the instructions further enable the processing device to determine a procedure for obfuscating the data records based on a classification of the data records.

14. A non-transitory computer-readable medium configured to store computer logic having instructions that enable a processing device to:
receive a request from a client to obfuscate data records associated with the client, the data records being stored in one or more databases throughout a network;
search, by at least one crawler tool, for one or more occurrences of the data records appearing throughout the network, based at least in part on one or more tasks to obfuscate data corresponding to the request, the one or more tasks being derived from the request and stored at a ledger;
store, by the crawler tool, information corresponding to one or more found occurrences of the data records;
determine that the data records can be obfuscated without causing undesirable consequences elsewhere in the network if at least a portion of the found occurrences are relied upon by other applications in the network;
select the one or more tasks from the ledger based on a determined priority; and
obfuscate the one or more found occurrences of the data records based on the one or more selected tasks.

15. The non-transitory computer-readable medium of claim 14, wherein the instructions further enable the processing device to query one or more data sources that store the one or more occurrences to determine whether the one or more data sources are legitimate and whether the data records still exist.

16. The non-transitory computer-readable medium of claim 14, wherein the instructions further enable the processing device to validate that the data records have indeed been removed or sufficiently obfuscated beyond recovery.

17. The non-transitory computer-readable medium of claim 16, wherein validating that the data records have indeed been removed or sufficiently obfuscated beyond recovery further includes determining that the data in the request no longer matches the data in the one or more databases.

* * * * *